US012281928B2

(12) United States Patent
Kim et al.

(10) Patent No.: US 12,281,928 B2
(45) Date of Patent: Apr. 22, 2025

(54) DEVICE FOR MEASURING AMOUNT OF SNOWFALL AND METHOD OF CONTROLLING THE SAME

(71) Applicant: National Institute of Meteorological Sciences, Seogwipo-si (KR)

(72) Inventors: Yoo Jun Kim, Gangneung-si (KR); Bo Yeong Ahn, Gangneung-si (KR)

(73) Assignee: NATIONAL INSTITUTE OF METEOROLOGICAL SCIENCES, Seogwipo-si (KR)

( * ) Notice: Subject to any disclaimer, the term of this patent is extended or adjusted under 35 U.S.C. 154(b) by 302 days.

(21) Appl. No.: 17/953,124

(22) Filed: Sep. 26, 2022

(65) Prior Publication Data

US 2023/0112192 A1    Apr. 13, 2023

(30) Foreign Application Priority Data

Oct. 12, 2021   (KR) .......................... 10-2021-0135026

(51) Int. Cl.
*G01F 23/292*   (2006.01)
*G01W 1/14*   (2006.01)

(52) U.S. Cl.
CPC ........... *G01F 23/2921* (2013.01); *G01W 1/14* (2013.01)

(58) Field of Classification Search
CPC ............................ G01F 23/2921; G01W 1/14
See application file for complete search history.

(56) References Cited

FOREIGN PATENT DOCUMENTS

| KR | 101548077 B1 | * | 8/2015 |
|----|--------------|---|--------|
| KR | 101552949 |   | 9/2015 |
| KR | 101677927 B1 | * | 11/2016 |
| KR | 101826986 B1 | * | 2/2018 |
| KR | 102204206 B1 | * | 1/2021 |

* cited by examiner

*Primary Examiner* — Jill E Culler
(74) *Attorney, Agent, or Firm* — CANTOR COLBURN LLP

(57) ABSTRACT

Provided are a device for measuring the amount of snowfall and a method of controlling the same, the device including a bottom plate, a graduated ruler extending upward from the bottom plate, an image capturing unit configured to capture an image of the graduated ruler and an upper portion of snow deposited on the bottom plate by using an image capturing device, a measurement unit configured to measure the amount of snowfall based on information on the captured image, and a snow removing unit configured to push out the deposited snow to the outside of the bottom plate while moving in a direction from one side to the other side of the bottom plate.

6 Claims, 9 Drawing Sheets

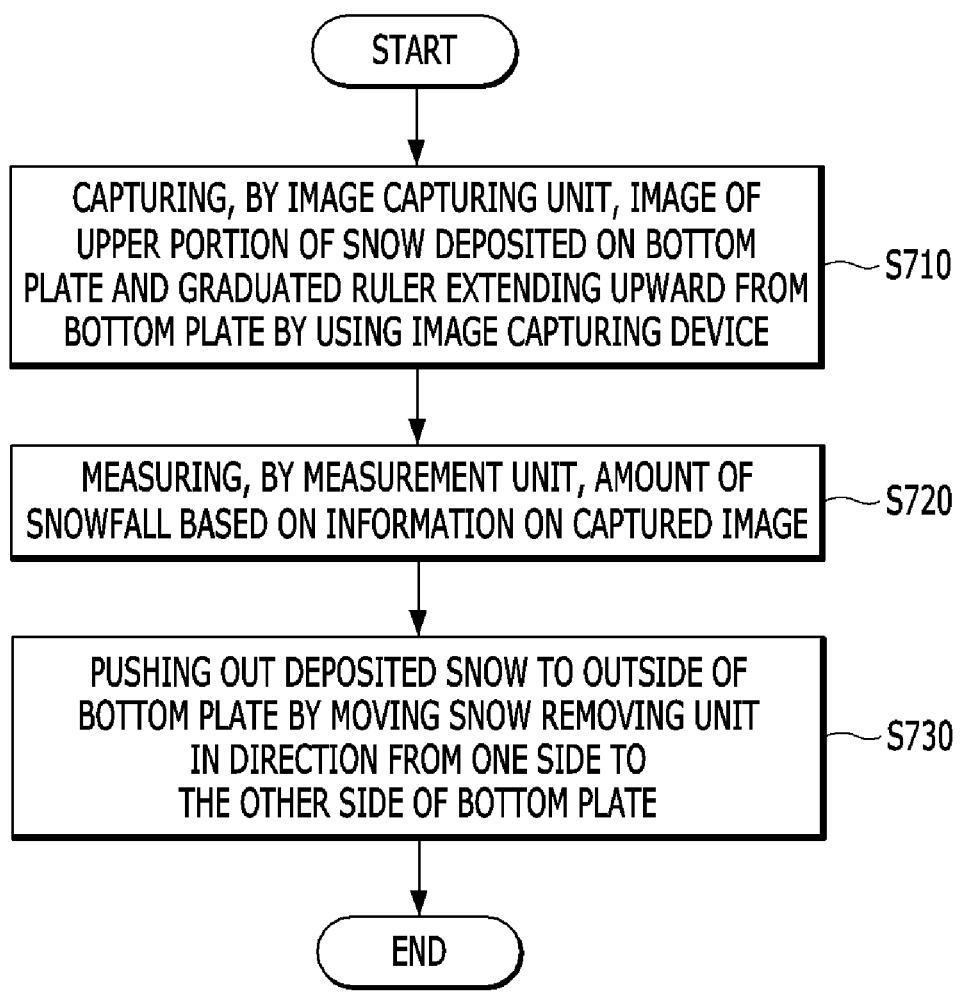

DEVICE FOR MEASURING AMOUNT OF SNOWFALL AND METHOD OF CONTROLLING THE SAME

BACKGROUND

Field

The present application relates to a device for measuring the amount of snowfall and a method of controlling the same.

Description of the Related Art

Snow gauges including ultrasonic snow gauges, laser snow gauges, and CCTV snow gauges, which are currently used at normal times in unmanned meteorological stations, cause reduced quality of snowfall measurement data because of measurement errors of measurement devices such as optical sensors.

In addition, the current device for measuring the amount of snowfall has a problem in that deposited snow is not appropriately removed after the measurement, which degrades accuracy during a subsequent measurement process.

There is a need for a system for measuring the amount of snowfall that accurately and repeatedly measures the amount of snowfall in response to an accelerating climatic change.

The background art of the present application is disclosed in Korean Patent No. 10-1552949.

SUMMARY

The present application has been made in an effort to solve the above-mentioned problems in the related art, and an object of the present application is to provide a device for measuring the amount of snowfall and a method of controlling the same, which are capable of solving a problem that reliability of a subsequently measured value deteriorates because of snow remaining on a measurement table after the amount of snowfall is measured.

The present application has been made in an effort to solve the above-mentioned problems in the related art, and an object of the present application is to provide a device for measuring the amount of snowfall and a method of controlling the same, which are capable of solving a problem that it is difficult to actively measure the amount of snowfall at an appropriate point in time.

However, technical problems to be solved by the exemplary embodiment of the present application are not limited to the aforementioned technical problem, and other technical problems may be present.

As the technical solution for achieving the technical objects, a device for measuring the amount of snowfall according to an embodiment of the present application may include: a bottom plate; a graduated ruler extending upward from the bottom plate; an image capturing unit configured to capture an image of the graduated ruler and an upper portion of snow deposited on the bottom plate by using an image capturing device; a measurement unit configured to measure the amount of snowfall based on information on the captured image; and a snow removing unit configured to push out the deposited snow to the outside of the bottom plate while moving in a direction from one side to the other side of the bottom plate.

According to the embodiment of the present application, the device may further include: an arm unit having one side end connected to the snow removing unit and the other side end connected to a driving unit; the driving unit positioned on a lower portion of the bottom plate and configured to move the arm unit to move the snow removing unit; and a control unit configured to control the driving unit and the image capturing unit.

According to the embodiment of the present application, the device may further include: a control unit configured to control the image capturing unit, the measurement unit, and the snow removing unit, in which the control unit stops an operation of the snow removing unit so that the snow is deposited for a first time interval, and in which the control unit operates the snow removing unit to push out the deposited snow for a second time interval.

According to the embodiment of the present application, the device may further include: a determination unit configured to determine whether the snow begins to be deposited, in which the image capturing unit captures an image of the upper portion of the deposited snow and the graduated ruler based on the determination result.

According to the embodiment of the present application, the determination unit may determine whether the snow begins to be deposited based on information on first image capturing, and the measurement unit may measure the amount of snowfall based on information on second image capturing.

According to the embodiment of the present application, the determination unit may determine whether the snow begins to be deposited by using a sensor.

According to the embodiment of the present application, the device may further include a control unit configured to control the image capturing unit, the measurement unit, and the snow removing unit based on information received from an external snowfall amount measuring device.

According to the embodiment of the present application, the control unit may control the image capturing unit, the measurement unit, and the snow removing unit based on whether the external snowfall amount measuring device operates or based on information on the amount of outside snowfall of the external snowfall amount measuring device.

According to the embodiment of the present application, the driving unit may include: a cylinder unit; and a piston unit positioned in the cylinder unit and configured to be moved forward or rearward within a stroke range by a hydraulic pressure, and the other side end of the arm unit may be connected to the piston unit.

A method of measuring the amount of snowfall according to another embodiment of the present application may include: capturing, by an image capturing unit, an image of an upper portion of snow deposited on a bottom plate and a graduated ruler extending upward from the bottom plate by using an image capturing device; measuring, by a measurement unit, the amount of snowfall based on information on the captured image; and pushing out the deposited snow to the outside of the bottom plate by moving a snow removing unit in a direction from one side to the other side of the bottom plate.

The technical solution is just illustrative but should not be interpreted as being intended to limit the present application. In addition to the above-mentioned exemplary embodiment, additional exemplary embodiments may be present in the drawings and the detailed description of the invention.

According to the technical solution of the present application, the remaining snow on the bottom plate is pushed out by the hydraulic pressure, which makes it possible to improve the reliability of the measured value of the amount of snowfall during the subsequent measurement process.

According to the technical solution of the present application, it is possible to measure the amount of snowfall at the optimum point in time by using the external snowfall amount measuring device.

However, the effects, which can be obtained by the present application, are not limited to the above-mentioned effects, and other effects may be present.

BRIEF DESCRIPTION OF THE DRAWINGS

The above and other aspects, features and other advantages of the present disclosure will be more clearly understood from the following detailed description taken in conjunction with the accompanying drawings, in which:

FIG. 7 is an operational flowchart of a method of controlling the device for measuring the amount of snowfall according to the embodiment of the present application.

DETAILED DESCRIPTION OF THE EMBODIMENT

Figure 1:
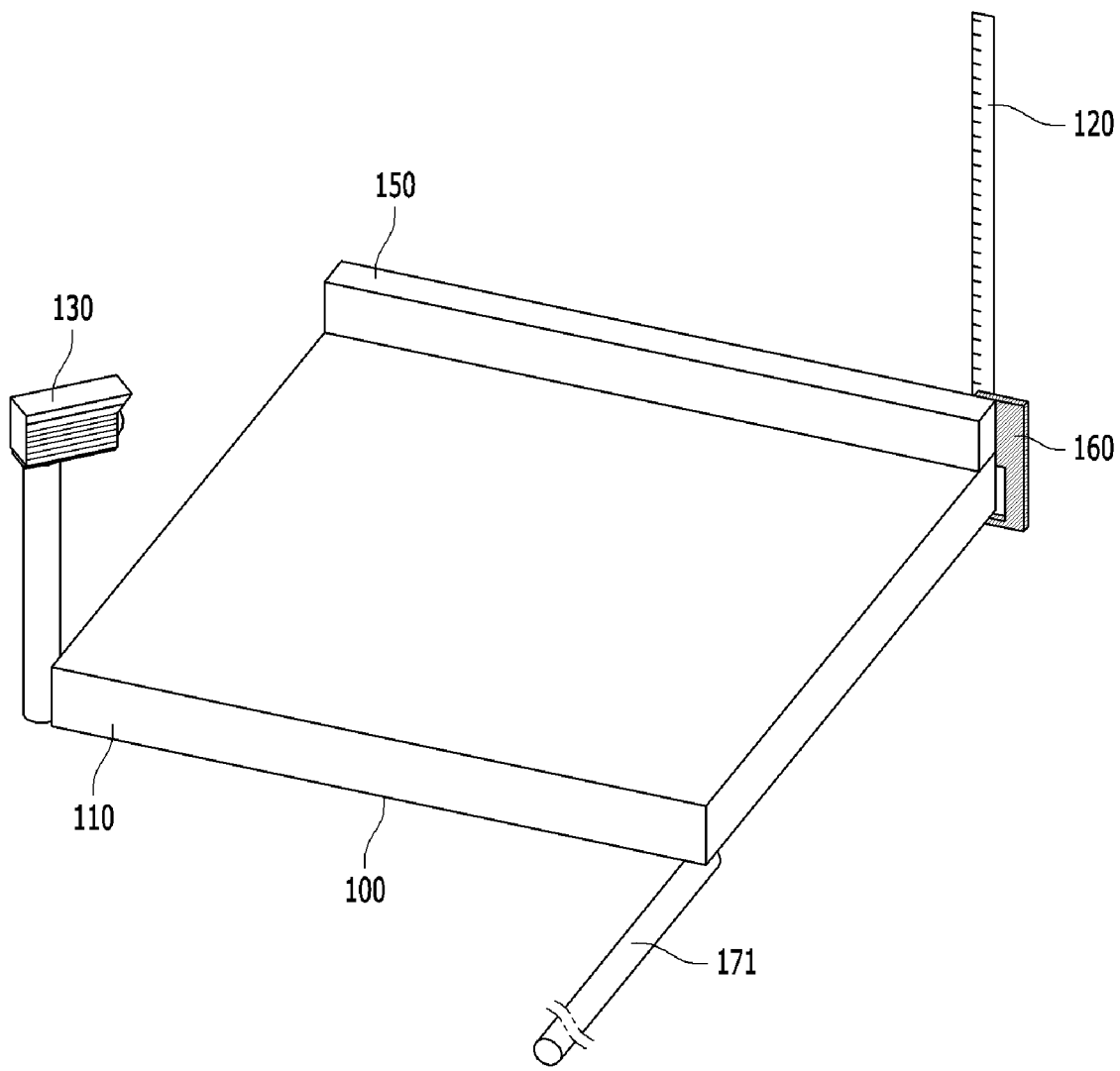
FIG. 1 is a schematic configuration view of a device for measuring the amount of snowfall according to an embodiment of the present application.

Hereinafter, exemplary embodiments of the present application will be described in detail with reference to the accompanying drawings so that those with ordinary skill in the art to which the present application pertains may easily carry out the exemplary embodiments. However, the present application may be implemented in various different ways, and is not limited to the exemplary embodiments described herein. A part irrelevant to the description will be omitted in the drawings in order to clearly describe the present application, and similar constituent elements will be designated by similar reference numerals throughout the specification.

Throughout the specification of the present application, when one constituent element is referred to as being "connected to" another constituent element, one constituent element can be "directly connected to" the other constituent element, and one constituent element can also be "electrically connected to" or "indirectly connected to" the other element with other elements therebetween.

Throughout the specification, when one member is disposed "on", "at an upper side of", "at an upper end of", "below", "at a lower side of", or "at a lower end of" another member in the present specification of the present application, this includes not only a case where one member is brought into contact with another member, but also a case where still another member is present between the two members.

Throughout the specification of the present application, unless explicitly described to the contrary, the word "comprise" or "include" and variations, such as "comprises", "comprising", "includes" or "including", will be understood to imply the inclusion of stated constituent elements, not the exclusion of any other constituent elements.

FIG. 1 is a schematic configuration view of a device for measuring the amount of snowfall according to an embodiment of the present application.

Referring to FIG. 1, a device 100 for measuring the amount of snowfall may include: a bottom plate 110; a graduated ruler 120 extending upward from the bottom plate 110; an image capturing unit 130 configured to capture an image of the graduated ruler 120 and snow deposited on the bottom plate 110 by using an image capturing device; a measurement unit 140 configured to measure the amount of snowfall based on the captured image of the snow and the graduated ruler 120; and a snow removing unit 150 configured to push out the deposited snow to the outside of the bottom plate 110 while moving from one end of the bottom plate 110 to an opposite side. That is, to measure the amount of snowfall, the device 100 for measuring the amount of snowfall may capture an image of the graduated ruler 120 and the snow deposited on the bottom plate 110 by using the image capturing device, measure the amount of snowfall based on the captured image of the deposited snow and the graduated ruler 120, and then remove the snow by pushing out the snow deposited on the bottom plate 110 to the outside.

In addition, the device 100 for measuring the amount of snowfall may include: an arm unit 160 having one end connected to the snow removing unit 150 and the other end connected to a driving unit 170; the driving unit 170 positioned on a lower portion of the bottom plate 110 and configured to move the arm unit 160 to move the snow removing unit 150; and a control unit 180 configured to collect the image capturing unit 130. In addition, the control unit 180 may control not only the image capturing unit 130 but also the measurement unit 140 and the snow removing unit 150. The control unit 180 may stop an operation of the snow removing unit 150 so that snow is deposited on the bottom plate 110 for a preset time interval. The control unit 180 may operate the snow removing unit 150 to push out the snow deposited for the preset time interval. In addition, the device 100 for measuring the amount of snowfall may further include a determination unit 190 configured to determine whether snow begins to be deposited on the bottom plate 110. When the determination result indicates that snow begins to be deposited, the image capturing unit 130 may capture an image of the deposited snow and the graduated ruler 120. In addition, the determination unit 190 may use the image capturing device to determine whether snow begins to be deposited. The measurement unit 140 may also measure the amount of snowfall by using the image capturing device. In addition, the determination unit 190 may determine whether snow begins to be deposited by using various sensors such as a pressure sensor or a contact recognition sensor. In addition, the control unit 180 may control the image capturing unit 130, the measurement unit 140, and the snow removing unit 150 based on information received from an external snowfall amount measuring device (not illustrated). In addition, the control unit 180 may control the image capturing unit 130, the measurement unit 140, and the snow removing unit 150 based on whether the external snowfall amount measuring device (not illustrated) operates or information on the amount of outside snowfall of the external snowfall amount measuring device (not illustrated). In addition, the driving unit 170 may include a cylinder unit 171, and a piston unit 172 positioned in the cylinder unit 171 and configured to be moved forward or rearward within a stroke range by a hydraulic pressure. The piston unit 172 may be connected to a portion of the arm unit 160 that is not connected to the snow removing unit 150.

According to the embodiment of the present application, the device 100 for measuring the amount of snowfall may provide a snowfall amount measurement menu to a user terminal (not illustrated). For example, the user terminal (not illustrated) may download and install an application program provided by the device 100 for measuring the amount of snowfall, and the snowfall amount measurement menu may be provided through the installed application.

The device 100 for measuring the amount of snowfall may include all types of servers, terminals, or devices that transmit or receive data, contents, and various types of communication signals to or from the user terminal (not illustrated) through networks and have functions of storing and processing data.

The user terminal (not illustrated) may be a device that operates in conjunction with the device 100 for measuring the amount of snowfall through a network. For example, the user terminal may be all types of wireless communication devices such as a smartphone, a smart pad, a tablet PC, a wearable device, a personal communication system (PCS), a global system for mobile communication (GSM), a personal digital cellular (PDC), a personal handy phone system (PHS), a personal digital assistant (PDA), an international mobile telecommunication (IMT)-2000, a code division multiple access (CDMA)-2000, a W-code division multiple access (W-CDMA), a wireless broadband internet (Wibro) terminal, and a stationary terminal such as a desktop computer and a smart TV.

Examples of the network for sharing information between the device 100 for measuring the amount of snowfall and the user terminal (not illustrated) may include, but not limited to, the 3rd generation partnership project (3GPP) network, the long-term evolution (LTE) network, the 5G network, the world interoperability for microwave access (WIMAX) network, the wired or wireless Internet, the local area network (LAN), the wireless local area network (Wireless LAN), the wide area network (WAN), the personal area network (PAN), the Bluetooth network, the Wi-Fi network, the near field communication (NFC) network, the satellite broadcast network, the analog broadcast network, the digital multimedia broadcasting (DMB) network, or the like.

Figure 2A:
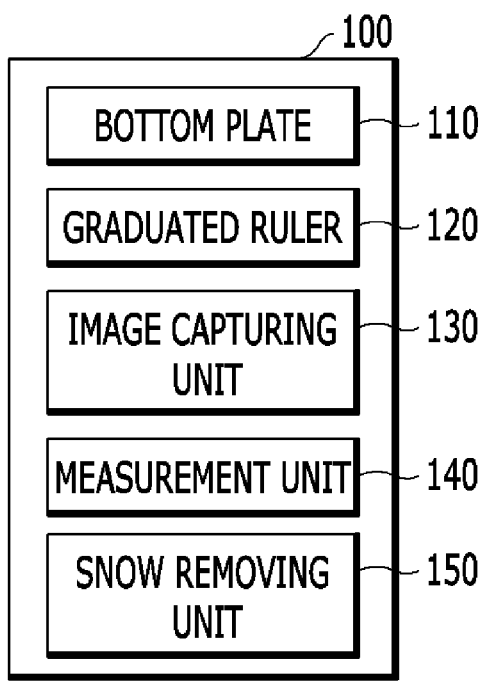
FIG. 2A is a schematic block diagram related to essential components of the device for measuring the amount of snowfall according to the embodiment of the present application.

FIG. 2A is a schematic block diagram related to essential components of the device 100 for measuring the amount of snowfall according to the embodiment of the present application.

Referring to FIG. 2A, the device 100 for measuring the amount of snowfall may include, as the essential components, the bottom plate 110, the graduated ruler 120, the image capturing unit 130, the measurement unit 140, and the snow removing unit 150.

The device 100 for measuring the amount of snowfall according to the embodiment of the present application may include the bottom plate 110.

For example, the bottom plate 110 may be flat so that the amount of snowfall may be measured. The bottom plate 110 may have a circular or polygonal shape. The bottom plate 110 may include a contact sensor, a temperature sensor, or the like to detect snow deposited on an upper portion of the bottom plate 110. The bottom plate 110 may be transparent. The image capturing device may be provided on the lower portion of the bottom plate 110 so that a lens is directed toward an upper portion of the bottom plate 110. The image capturing device may capture an image of the bottom plate 110, thereby detecting snow deposited on the upper portion of the bottom plate 110. A heating wire may be embedded in the bottom plate 110 and melt the snow deposited on the bottom plate 110. A material of the bottom plate 110 may be one or more of glass, synthetic resin, wood, and metal. A vibration member may be embedded in the bottom plate 110 and apply vibration to remove the snow deposited on the bottom plate 110.

In addition, a battery and collapsible fences each having a solar plate are provided on the bottom plate 110 or a peripheral portion of the bottom plate 110. The battery may be charged with solar energy and used as reserve electric power. For example, the device 100 for measuring the amount of snowfall may further include a lateral driving unit (not illustrated) configured to adjust an angle between the bottom plate 110 and the plurality of collapsible fences (not illustrated) configured to surround the peripheral portion of the bottom plate 110. The lateral driving unit (not illustrated) may operate all the plurality of collapsible fences (not illustrated) provided on the peripheral portion of the bottom plate 110 so that all the plurality of collapsible fences are perpendicular to the bottom plate 110 until after a second unit point in time at which the measurement unit 140 completely measures the amount of snowfall from before a first unit point in time at which snow is deposited on the bottom plate 110 so that the image of the snow is captured and the amount of snowfall is measured. When snow is deposited on the bottom plate 110 in the state in which all the plurality of collapsible fences (not illustrated) provided on the peripheral portion of the bottom plate 110 are perpendicular to the bottom plate 110, the collapsible fences (not illustrated) maximally block factors, such as wind, that hinder the measurement of the deposited snow. Therefore, it is possible to comparatively more accurately measure the amount of snowfall.

In addition, first and second bottom plates may be symmetrically provided with respect to a rotation axis, and the first and second bottom plates may rotate about the rotation axis and remove the snow deposited on the first or second bottom plate.

The device 100 for measuring the amount of snowfall according to the embodiment of the present application may include the graduated ruler 120 extending upward from the bottom plate 110.

For example, the graduated ruler 120 may be maximum 100 cm. A bottom portion of the graduated ruler 120 may be positioned at an end of the upper portion of the bottom plate 110. The bottom portion of the graduated ruler 120 may be positioned on an upper surface of the bottom plate 110. The graduated ruler 120 may have graduations and symbols or Arabic numerals corresponding to heights corresponding to the graduations.

The device 100 for measuring the amount of snowfall according to the embodiment of the present application may include the image capturing unit 130 configured to capture an image of the graduated ruler 120 and an upper portion of the snow deposited on the bottom plate 110 by using the image capturing device.

For example, a distance between the image capturing unit 130 and the graduated ruler 120 may be a distance that enables the image capturing unit 130 to capture images of a lowermost graduation and an uppermost graduation of the graduated ruler 120. When a height of the deposited snow is 0 cm, the image capturing unit 130 may capture an image of the bottom plate 110 and the graduation corresponding to 0 cm of the graduated ruler 120. When a height of the deposited snow is 100 cm, the image capturing unit 130 may capture an image of the upper portion of the snow deposited on the bottom plate 110 and the graduation corresponding to 100 cm. The image capturing unit 130 may capture the image of the upper portion of the snow deposited on the bottom plate 110 and the graduated ruler 120 for a preset time.

The device 100 for measuring the amount of snowfall according to the embodiment of the present application may include the measurement unit 140 configured to measure the amount of snowfall based on information on the captured image.

For example, the measurement unit 140 may measure the amount of snowfall by performing image processing on the information on the image of the graduated ruler 120 and the upper portion of the snow deposited on the bottom plate 110. The measurement unit 140 may analyze the image information, recognize the graduated ruler 120 of an uppermost portion of the snow deposited on the bottom plate 110, and convert the image information into a binarized image. The measurement unit 140 may analyze the binarized image, recognize the upper portion of the snow, recognize the graduation of the graduated ruler 120 corresponding to the upper portion of the snow, recognize the Arabic numeral corresponding to the graduation, and convert the recognized upper portion of the snow into the amount of snowfall.

The device 100 for measuring the amount of snowfall according to the embodiment of the present application may include the snow removing unit 150 configured to push out the deposited snow to the outside of the bottom plate 110 while moving in a direction from one side to the other side of the bottom plate 110.

For example, the snow removing unit 150 may push out the deposited snow to the outside of the bottom plate 110 while moving in the direction from one side to the other side of the bottom plate 110 for a preset time. The snow removing unit 150 may push out the deposited snow to the outside of the bottom plate 110 while moving in the direction from one side to the other side of the bottom plate 110 a preset number of times for a preset time. The device 100 for measuring the amount of snowfall may further include a vibration unit (not illustrated) configured to apply vibration to the bottom plate 110 by using the vibration member provided in the bottom plate 110. The vibration unit may apply vibration to the bottom plate 110 by using the vibration member provided in the bottom plate 110 while the snow removing unit 150 moves in the direction from one side to the other side of the bottom plate 110. The device 100 for measuring the amount of snowfall may further include a heating wire unit (not illustrated) configured to apply heat with a preset temperature to the upper portion of the bottom plate 110 by using the heating wire provided in the bottom plate 110. The heating wire unit may apply heat with a preset temperature to the upper portion of the bottom plate 110 by using the heating wire provided in the bottom plate 110 while the snow removing unit 150 moves in the direction from one side to the other side of the bottom plate 110.

Figure 2B:
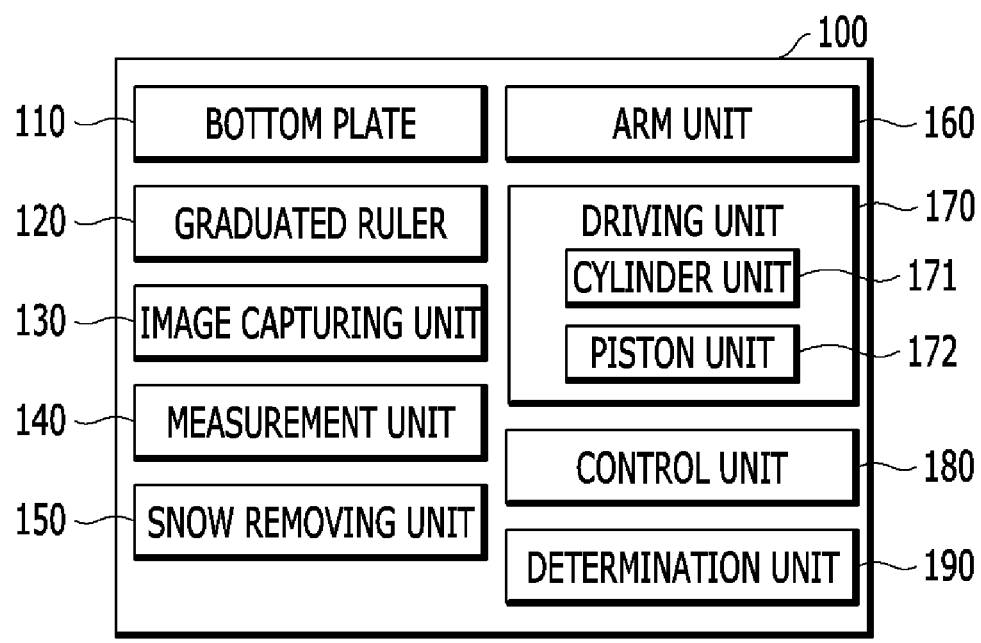
FIG. 2B is a schematic block diagram related to expanded components of the device for measuring the amount of snowfall according to the embodiment of the present application.

FIG. 2B is a schematic block diagram related to expanded components of the device 100 for measuring the amount of snowfall according to the embodiment of the present application.

Referring to FIG. 2B, the device 100 for measuring the amount of snowfall may include the bottom plate 110, the graduated ruler 120, the image capturing unit 130, the measurement unit 140, and the snow removing unit 150, as the essential components. The device 100 for measuring the amount of snowfall may further include the arm unit 160, the driving unit 170 including the cylinder unit 171 and the piston unit 172, the control unit 180, and the determination unit 190, as the expanded components.

Figure 3:
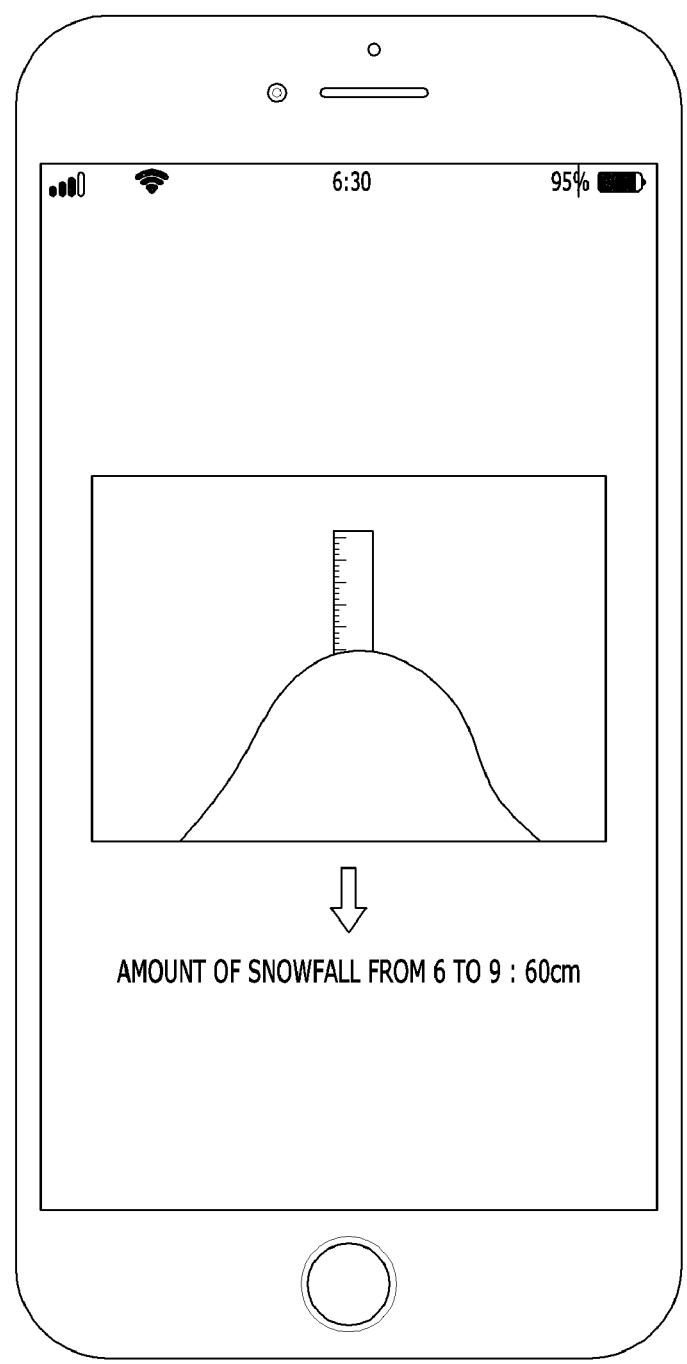
FIG. 3 is a view illustrating a display of a user terminal that receives information on the amount of snowfall measured by the device for measuring the amount of snowfall according to the embodiment of the present application.

FIG. 3 is a view illustrating a display of the user terminal that receives information on the amount of snowfall measured by the device 100 for measuring the amount of snowfall according to the embodiment of the present application.

Referring to FIG. 3, the image capturing unit 130 of the device 100 for measuring the amount of snowfall may capture an image of the graduated ruler 120 and the upper portion of the snow deposited on the bottom plate 110, and the measurement unit 140 may measure the amount of snowfall based on the captured image of the upper portion of the snow and the graduated ruler 120. The device 100 for measuring the amount of snowfall may transmit the captured image of the upper portion of the snow and the graduated ruler 120 and the measured amount of snowfall to the user terminal (not illustrated), such that the user may ascertain the captured image of the upper portion of the snow and the graduated ruler 120 and the measured amount of snowfall through the display of the user terminal (not illustrated).

Figure 4A:
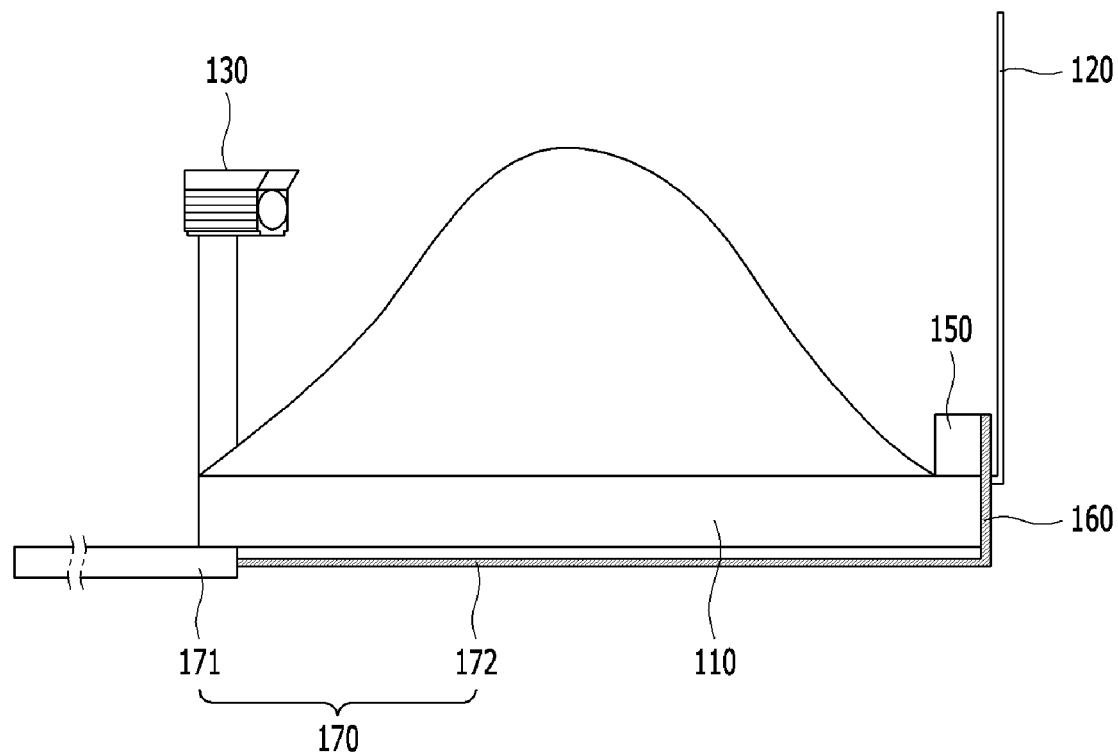
FIG. 4A is a view illustrating a state in which snow is not removed by the device for measuring the amount of snowfall according to the embodiment of the present application.

FIG. 4A is a view illustrating a state in which snow is not removed by the device 100 for measuring the amount of snowfall according to the embodiment of the present application.

Referring to FIG. 4A, the image capturing unit 130 and the graduated ruler 120 may be provided symmetrically at the end of the bottom plate 110, and the image capturing unit 130 may capture an image of the graduated ruler 120 and the snow deposited on the bottom plate 110. The snow removing unit 150 may be provided on the upper portion of the end of the bottom plate 110. The cylinder unit 171 and the piston unit 172 of the driving unit 170 may be provided on the lower portion of the bottom plate 110, and the arm unit 160 may connect the snow removing unit 150 and the piston unit 172, such that the snow removing unit 150 may be moved in the same direction as the piston unit 172 by the motion of the piston unit 172. Before the snow is removed, the piston unit 172 may be maximally extended to the outside of the cylinder unit 171, and therefore, the snow removing unit 150 may be positioned on the upper portion of one end of the bottom plate 110.

Figure 4B:
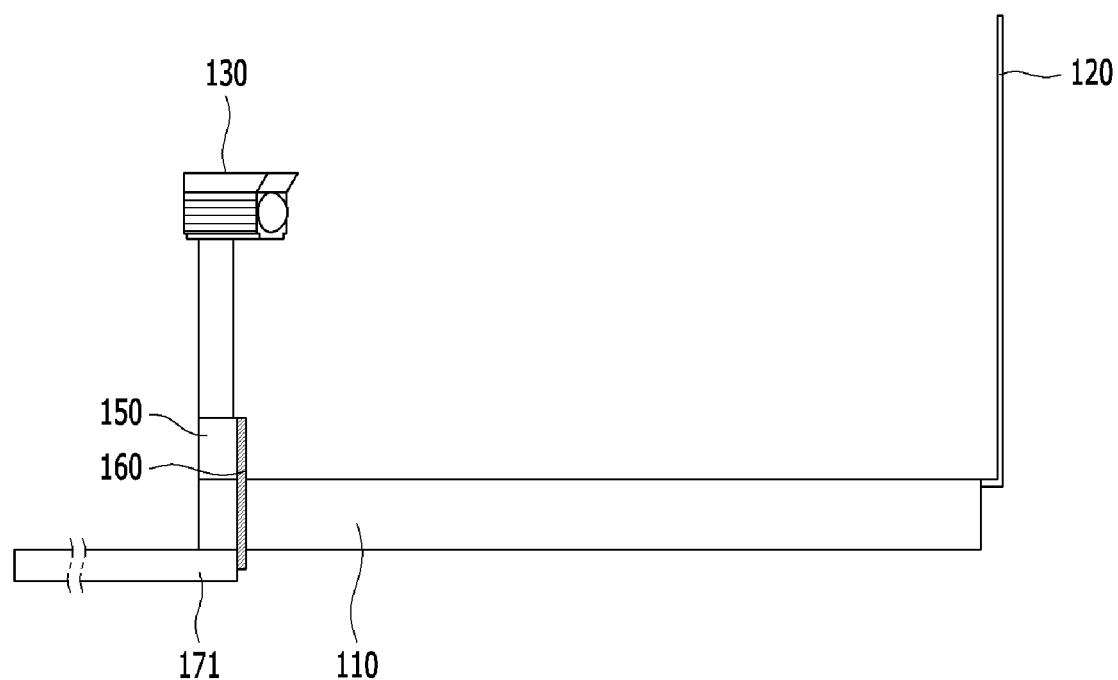
FIG. 4B is a view illustrating a state in which snow is removed by the device for measuring the amount of snowfall according to the embodiment of the present application.

FIG. 4B is a view illustrating a state in which snow is removed by the device 100 for measuring the amount of snowfall according to the embodiment of the present application.

Referring to FIG. 4B, as described above, the snow removing unit 150 connected to the piston unit 172 by the arm unit 160 may be moved in the same direction as the piston unit 172 when the piston unit 172 moves in a forward/rearward direction. Therefore, to remove the snow, the piston unit 172 may be maximally inserted into the cylinder unit 171, such that the snow removing unit 150 may push out the snow to the outside of the bottom plate 110 while moving from one end of the bottom plate 110 to the opposite end of the bottom plate 110.

Figure 5:
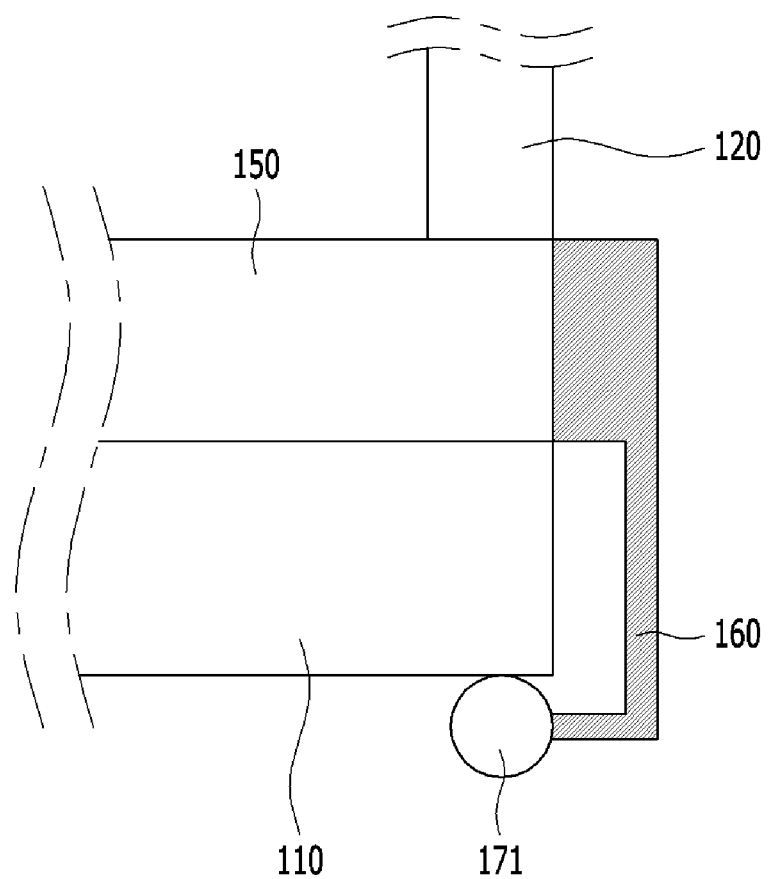
FIG. 5 is an enlarged view illustrating a coupling structure between a bottom plate, a graduated ruler, a snow removing unit, an arm unit, and a cylinder unit of the device for measuring the amount of snowfall according to the embodiment of the present application.

FIG. 5 is an enlarged view illustrating a coupling structure between the bottom plate 110, the graduated ruler 120, the snow removing unit 150, the arm unit 160, and the cylinder unit 171 of the device 100 for measuring the amount of snowfall according to the embodiment of the present application.

Referring to FIG. 5, the graduated ruler 120 is positioned vertically upward at one end of the bottom plate 110, and the snow removing unit 150 may be positioned above the bottom plate 110. One side of the arm unit 160 may be connected to the snow removing unit 150, and the other side of the arm unit 160 may be connected to the piston unit 172. The cylinder unit 171 and the piston unit 172 may be positioned on the lower portion of the bottom plate 110.

Figure 6:
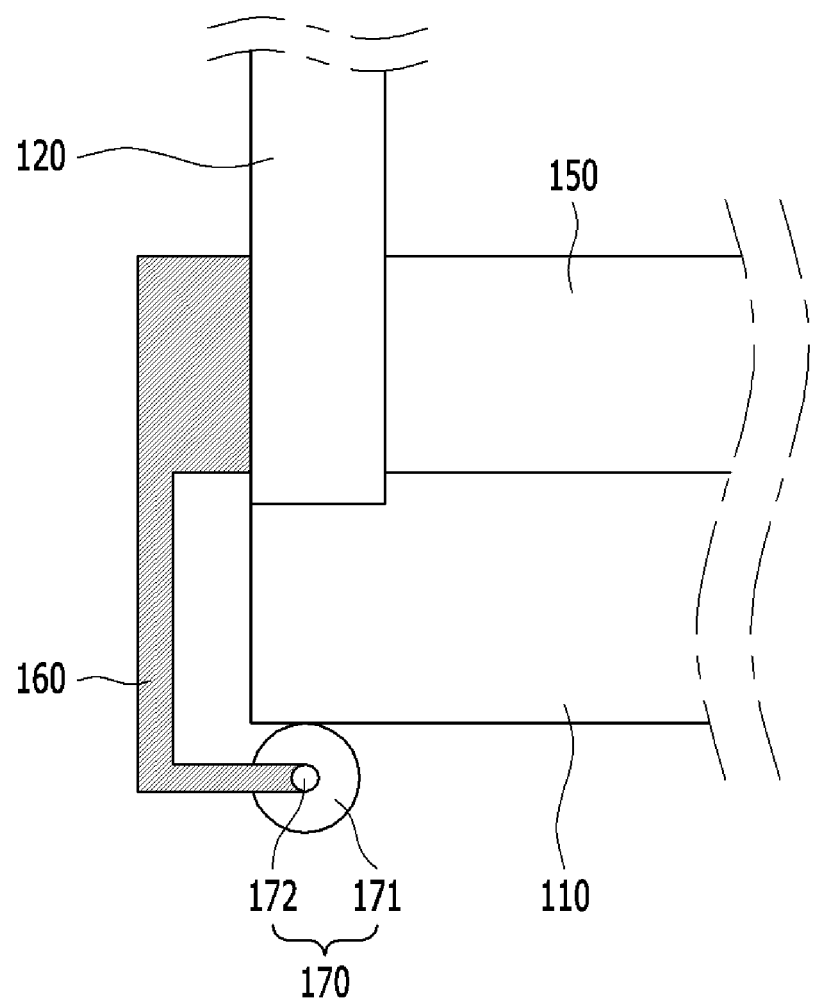
FIG. 6 is an enlarged view illustrating a coupling structure between the bottom plate, the graduated ruler, the snow removing unit, the arm unit, the cylinder unit, and a piston unit of the device for measuring the amount of snowfall according to the embodiment of the present application.

FIG. 6 is an enlarged view illustrating a coupling structure between the bottom plate 110, the graduated ruler 120, the snow removing unit 150, the arm unit 160, the cylinder unit 171, and the piston unit 172 of the device 100 for measuring the amount of snowfall according to the embodiment of the present application.

Referring to FIG. 6, the graduated ruler 120 may be positioned at the end of the bottom plate 110, and the snow removing unit 150 may be positioned above the bottom plate 110. As described above, the arm unit 160 may be connected to one side of the snow removing unit 150 and the piston unit 172.

According to the embodiment of the present application, the device 100 for measuring the amount of snowfall may further include the arm unit 160 having one side end connected to the snow removing unit 150 and the other side end connected to the driving unit 170.

For example, one side end of a first arm unit (not illustrated) may be connected to the snow removing unit 150, the other side end of the first arm unit may be connected to a first driving unit (not illustrated), one side end of a second arm unit (not illustrated) may be connected to a portion of the snow removing unit 150, which is not connected to the first arm unit (not illustrated), and the other side end of the second arm unit may be connected to a second driving unit (not illustrated).

According to the embodiment of the present application, the device 100 for measuring the amount of snowfall may further include the driving unit 170 positioned on the lower portion of the bottom plate 110 and configured to move the arm unit 160 to move the snow removing unit 150.

For example, the first driving unit (not illustrated) may be positioned on the lower portion of one side of the bottom plate 110 and move the first arm unit (not illustrated) to move the snow removing unit 150. The second driving unit (not illustrated) may be positioned on the lower portion of the other side of the bottom plate 110 and move the second arm unit (not illustrated) to move the snow removing unit 150. The movement of the first arm unit (not illustrated) by the first driving unit (not illustrated) and the movement of the second arm unit (not illustrated) by the second driving unit (not illustrated) may be simultaneously performed in the same direction. The second driving unit (not illustrated) may not move the second arm unit (not illustrated) while the first driving unit (not illustrated) reciprocates the first arm unit (not illustrated) once. The first driving unit (not illustrated) may not move the first arm unit (not illustrated) while the second driving unit (not illustrated) reciprocates the second arm unit (not illustrated) once.

According to the embodiment of the present application, the device 100 for measuring the amount of snowfall may further include the control unit 180 configured to control the driving unit 170 and the image capturing unit 130.

For example, the control unit 180 may control the driving unit 170 so that the piston unit 172 included in the driving unit 170 is inserted into the cylinder unit 171 included in the driving unit 170 or the piston unit 172 is extended from the cylinder unit 171. The control unit 180 may control the image capturing unit 130 so that the image capturing unit 130 captures an image of the bottom plate 110 and the graduated ruler 120. The control unit 180 may capture an image of the bottom plate 110 by controlling the image capturing unit 130. After the image capturing unit 130 captures the image of the graduated ruler 120 and the upper portion of the snow deposited on the bottom plate 110, the control unit 180 moves the arm unit 160 connected to the driving unit 170 by controlling the driving unit 170, such that the snow removing unit 150 connected to the arm unit 160 may push out the snow to the outside of the bottom plate 110 while moving from one side to the other side of the bottom plate 110. The control unit 180 may allow the image capturing unit 130 to capture an image of the bottom plate 110, the graduated ruler 120, and the snow deposited on the bottom plate 110 for a preset time. The control unit 180 may control the driving unit 170 so that the snow removing unit 150 moves from one side to the other side of the upper portion of the bottom plate 110 a preset number of times for a preset time. The control unit 180 may control the image capturing unit 130 and the snow removing unit 150 so that the image capturing unit 130 captures images of a process in which the snow removing unit 150 removes the deposited snow. The control unit 180 may perform control to stop the second driving unit (not illustrated) while the first driving unit (not illustrated) operates the preset number of times for the preset time. The control unit 180 may perform control to stop the first driving unit (not illustrated) while the second driving unit (not illustrated) operates the preset number of times for the preset time. The control unit 180 may perform control to move the first driving unit (not illustrated) and the second driving unit (not illustrated) simultaneously in the same direction.

According to the embodiment of the present application, the device 100 for measuring the amount of snowfall may further include the control unit 180 configured to control the image capturing unit 130, the measurement unit 140, and the snow removing unit 150.

For example, the control unit 180 may capture an image of the bottom plate 110 by controlling the image capturing unit 130. After the image capturing unit 130 captures the image of the graduated ruler 120 and the upper portion of the snow deposited on the bottom plate 110, the control unit 180 moves the arm unit 160 connected to the driving unit 170 by controlling the driving unit 170, such that the snow removing unit 150 connected to the arm unit 160 may push out the snow to the outside of the bottom plate 110 while moving from one side to the other side of the bottom plate 110. Further, the control unit 180 may control the driving unit 170 so that the snow removing unit 150 reciprocates from one side to the other side of the upper portion of the bottom plate 110 until the amount of snowfall on the bottom plate 110, which is measured by the measurement unit 140 by being controlled by the control unit 180, becomes 0 cm.

According to the embodiment of the present application, the control unit 180 may stop the operation of the snow removing unit 150 so that the snow is deposited for a first time interval. Further, the control unit 180 may operate the snow removing unit 150 so that the snow removing unit 150 pushes out the deposited snow for a second time interval.

For example, the control unit 180 may stop the operation of the first driving unit (not illustrated) and the operation of the second driving unit (not illustrated) so that snow is deposited for the first time interval. Further, the control unit 180 may perform control to operate the first driving unit (not illustrated) or the second driving unit (not illustrated) or simultaneously operate both the first driving unit (not illustrated) and the second driving unit (not illustrated) in the same direction so that the snow removing unit 150 pushes out the snow deposited on the bottom plate 110 for the second time interval. For example, the first time interval may be three hours.

According to the embodiment of the present application, the device 100 for measuring the amount of snowfall may further include the determination unit 190 configured to determine whether snow begins to be deposited.

For example, the determination unit 190 may determine whether snow begins to be deposited on the bottom plate 110 by using at least one of various sensors such as a pressure sensor, a contact recognition sensor, and a temperature sensor.

According to the embodiment of the present application, the image capturing unit 130 may capture an image of the upper portion of the deposited snow and the graduated ruler 120 based on the determination result.

For example, when the determination unit 190 determines that snow begins to be deposited on the upper portion of the bottom plate 110, the image capturing unit 130 may capture an image of the upper portion of the deposited snow and the graduated ruler 120. When the determination unit 190 determines that snow does not begin to be deposited on the bottom plate 110, the image capturing unit 130 may capture an image of the bottom plate 110 and the graduated ruler 120.

According to the embodiment of the present application, the determination unit 190 may determine whether snow begins to be deposited based on information on first image capturing.

For example, the determination unit 190 may determine that snow begins to be deposited when the presence of snow on the bottom plate 110 is recognized, instead of a state of the bottom plate 110 immediately after the snow is removed, based on information on the first image capturing in which the image capturing unit 130 captures the image of the bottom plate 110 and the graduated ruler 120.

According to the embodiment of the present application, the measurement unit 140 may measure the amount of snowfall based on information on second image capturing.

For example, the measurement unit 140 may measure the amount of snowfall based on information on the second image capturing in which the image capturing unit 130 captures the image of the graduated ruler 120 and the upper portion of the snow deposited on the upper portion of the bottom plate 110.

According to the embodiment of the present application, the determination unit 190 may use the sensor to determine whether snow begins to be deposited.

For example, the determination unit 190 may determine whether snow begins to be deposited on the bottom plate 110 by using one or more of various sensors such as a pressure sensor, a contact recognition sensor, and a temperature sensor.

According to the embodiment of the present application, the device 100 for measuring the amount of snowfall may further include the control unit 180 configured to control the image capturing unit 130, the measurement unit 140, and the snow removing unit 150 based on information received from the external snowfall amount measuring device (not illustrated).

For example, based on information received from one or more external snowfall amount measuring devices (not illustrated), the control unit 180 may perform control to operate the snow removing unit 150 to remove the remaining snow on the bottom plate 110 when the information received from the external snowfall amount measuring device (not illustrated) within a preset distance is information indicating that snow begins to fall.

According to the embodiment of the present application, the control unit 180 may control the image capturing unit 130, the measurement unit 140, and the snow removing unit 150 based on whether the external snowfall amount measuring device (not illustrated) operates or information on the amount of outside snowfall of the external snowfall amount measuring device (not illustrated).

For example, when the control unit 180 receives information indicating that the external snowfall amount measuring device (not illustrated) within a preset distance has operated, the control unit 180 may control the image capturing unit 130, the measurement unit 140, and the snow removing unit 150. When the control unit 180 receives information on the amount of outside snowfall equal to or larger than a preset critical value from the external snowfall amount measuring device (not illustrated), the control unit 180 may control the image capturing unit 130, the measurement unit 140, and the snow removing unit 150.

According to the embodiment of the present application, the driving unit 170 may include: the cylinder unit 171; and the piston unit 172 positioned in the cylinder unit 171 and configured to be moved forward or rearward within a stroke range by a hydraulic pressure.

For example, the first driving unit (not illustrated) may include: the first cylinder unit (not illustrated); and the first piston unit (not illustrated) positioned in the first cylinder unit (not illustrated) and configured to be moved forward or rearward within a stroke range by a hydraulic pressure. The second driving unit (not illustrated) may include: the second cylinder unit (not illustrated); and the second piston unit (not illustrated) positioned in the second cylinder unit (not illustrated) and configured to be moved forward or rearward within a stroke range by a hydraulic pressure. A dimension of the first cylinder unit (not illustrated) may be identical to a dimension of the second cylinder unit (not illustrated). A dimension of the first piston unit (not illustrated) may be identical to a dimension of the second piston unit (not illustrated).

According to the embodiment of the present application, the other side end of the arm unit 160 may be connected to the piston unit 172.

For example, one end of the first arm unit (not illustrated), which is not connected to the snow removing unit 150, may be connected to the first piston unit (not illustrated). One end of the second arm unit (not illustrated), which is not connected to the snow removing unit 150, may be connected to the second piston unit (not illustrated).

Hereinafter, an operation flow of the present application will be briefly described with reference to the contents described above in detail.

FIG. 7 is an operational flowchart of a method of controlling the device 100 for measuring the amount of snowfall according to the embodiment of the present application.

The method of measuring the amount of snowfall illustrated in FIG. 7 may be performed by the above-mentioned device 100 for measuring the amount of snowfall. Therefore, the contents described regarding the device 100 for measuring the amount of snowfall may be equally applied to the description of the method of measuring the amount of snowfall even though the contents are omitted.

In step S710, the image capturing unit 130 may capture an image of the upper portion of the snow deposited on the bottom plate 110 and the graduated ruler 120 extending upward from the bottom plate 110 by using the image capturing device.

In step S720, the measurement unit 140 may measure the amount of snowfall based on information on the captured image.

In step S730, the snow removing unit 150 may push out the deposited snow to the outside of the bottom plate 110 while moving in the direction from one side to the other side of the bottom plate 110.

In the above-mentioned description, steps S710, S720, and S730 may be divided into additional steps or combined into fewer steps according to the embodiment of the present application. In addition, some steps may be eliminated as necessary. The order of the steps may be changed.

The method of measuring the amount of snowfall according to the embodiment of the present application may be implemented in the form of program commands executable by means of various computer means and then written in a computer-readable recording medium. The computer-readable medium may include program instructions, data files, data structures, or the like, in a stand-alone form or in a combination thereof. The program instructions recorded in the medium may be specially designed and configured for the present disclosure or may be known and available to those skilled in computer software. Examples of the computer-readable recording medium may include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions. Examples of the program instructions may include machine codes made by, for example, a compiler, as well as high-language codes that may be executed by an electronic data processing device, for example, a computer, by using an interpreter. The above-mentioned hardware devices may be configured to operate as one or more software modules in order to perform the operation of the present disclosure, and the opposite is also possible.

In addition, the method of measuring the amount of snowfall may also be implemented in the form of a computer program or application stored in a recording medium and executed by a computer.

It will be appreciated that the embodiments of the present application have been described above for purposes of illustration, and those skilled in the art may understand that the present application may be easily modified in other specific forms without changing the technical spirit or the essential features of the present application. Therefore, it should be understood that the above-described embodiments are illustrative in all aspects and do not limit the present disclosure. For example, each component described as a single type may be carried out in a distributed manner. Likewise, components described as a distributed type can be carried out in a combined type.

The scope of the present application is represented by the claims to be described below rather than the detailed description, and it should be interpreted that the meaning and scope of the claims and all the changes or modified forms derived from the equivalent concepts thereto fall within the scope of the present application.

What is claimed is:

1. A device for measuring an amount of snowfall, the device comprising:
   a bottom plate on which a snow is able to be deposited;
   a graduated ruler extending upward from the bottom plate;
   an image capturing unit configured to capture an image of the graduated ruler and an image of an upper portion of the snow deposited on the bottom plate by using an image capturing device;
   a measurement unit configured to measure an amount of snowfall based on information on the captured image of the graduated ruler and the captured image of the upper portion of the snow;
   a snow removing unit configured to push out the deposited snow to an outside of the bottom plate while moving in a direction from one side of the bottom plate to the other side thereof;
   an arm unit having one side end connected to the snow removing unit and the other side end connected to a driving unit, wherein the driving unit is positioned on a lower portion of the bottom plate and configured to move the arm unit to move the snow removing unit; and
   a control unit configured to control the image capturing unit, the measurement unit, the driving unit, and the snow removing unit,
   wherein the control unit is configured to stop an operation of the snow removing unit so that the snow is allowed to be deposited for a preset time interval, and to operate the snow removing unit to push out the deposited snow for the preset time interval,
   wherein the driving unit comprises: a cylinder unit; and a piston unit positioned inside the cylinder unit and configured to move forward or rearward within a stroke range by a hydraulic pressure, and wherein the other side end of the arm unit is connected to the piston unit.

2. The device of claim 1, further comprising:
   a determination unit configured to determine whether the snow begins to be deposited, wherein the image capturing unit operates based on the determination result of the determination unit.

3. The device of claim 1, further comprising:
   a determination unit configured to determine whether the snow begins to be deposited based on information on first image capturing of the image capturing unit,
   wherein the measurement unit measures the amount of snowfall based on information on second image capturing of the image capturing unit.

4. The device of claim 1, further comprising:
   a determination unit configured to determine whether the snow begins to be deposited by using a sensor.

5. The device of claim 1, wherein the control unit is configured to control the image capturing unit, the measurement unit, and the snow removing unit based on information received from an external snowfall amount measuring device.

6. The device of claim 1, wherein the control unit is configured to control the image capturing unit, the measurement unit, and the snow removing unit based on whether an external snowfall amount measuring device operates or based on information on an amount of snowfall of the external snowfall amount measuring device.

* * * * *